R. WEDEMANN.
FOLDING SEAT CONVERTIBLE INTO BED.
APPLICATION FILED AUG. 13, 1921.

1,429,388.

Patented Sept. 19, 1922.
2 SHEETS—SHEET 1.

Witnesses:
Hermann Fahlberg
Willi Jahn

Inventor
Richard Wedemann
by
P. Arndt Atty

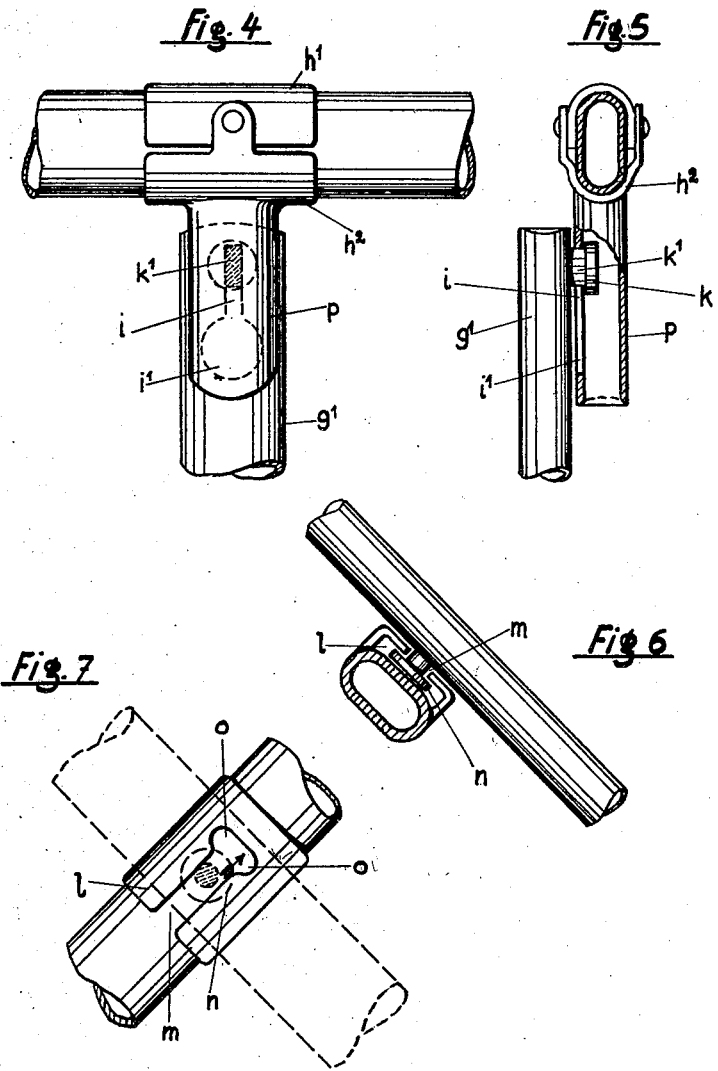

Patented Sept. 19, 1922.

1,429,388

UNITED STATES PATENT OFFICE.

RICHARD WEDEMANN, OF BRUNSWICK, GERMANY.

FOLDING SEAT CONVERTIBLE INTO BED.

Application filed August 13, 1921. Serial No. 492,059.

*To all whom it may concern:*

Be it known that I, RICHARD WEDEMANN, residing at Brunswick, Germany, have invented certain new and useful Improvements in Folding Seats Convertible into Beds, of which the following is a specification.

My invention relates to improvements in folding seats convertible into beds, and the objects of the improvements are to provide a seat and bed which can readily be converted, which has a low weight, and which can be manufactured at low cost. With these and other objects in view my invention consists in constructing the seat from a pair of crossing frames adapted to be rocked relatively to each other for converting the same into a bed or couch.

In order that the invention be more clearly understood several examples embodying the same have been shown in the accompanying drawings in which the same letters of reference have been used in all the views to indicate corresponding parts. In said drawings, Fig. 1, is a side view of the seat, Fig. 2, is a similar side view showing the same as converted into a bed, Fig. 3, is a detail view showing the joint of a subsidiary leg used in the seat and bed, Fig. 4, is a similar detail view showing a modification of the subsidiary leg, Fig. 5, is a side view of Fig. 4 partly in section, Fig. 6, is a sectional detail view showing a preferred form of the pivotal joint between the frames forming the seat, and Fig. 7, is a side view of the pivotal joint illustrated in Fig. 6, a part of one of the frames and the section of the pivotal joint secured thereto being shown in full lines, and a part of the other frame with its section of the pivotal joint being shown in dotted lines.

Figure 1:
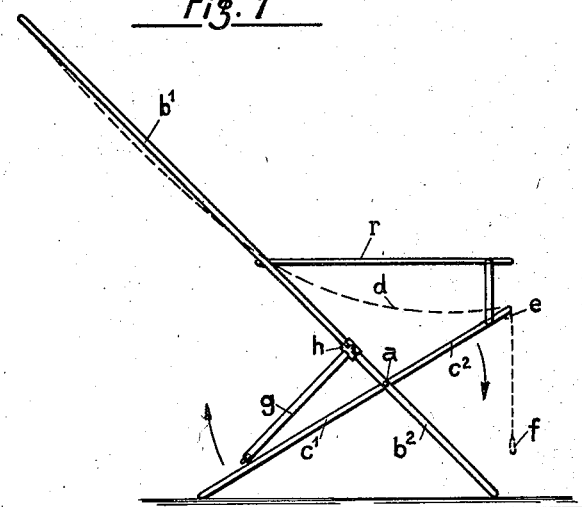
Figure 2:
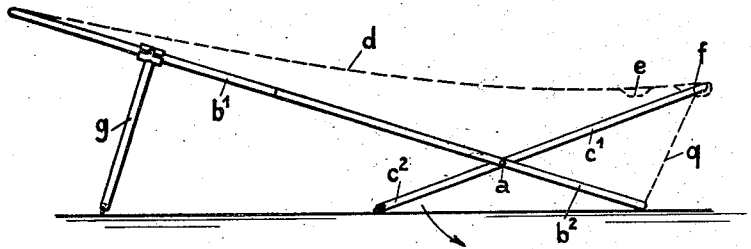
Figure 3:
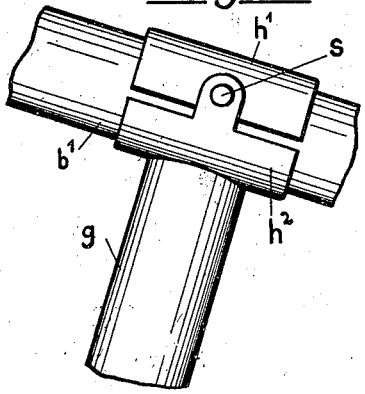

In the example shown in Figs. 1 and 2 my improved convertible seat and bed consists of two frames $b^1$, $b^2$ and $c^1$, $c^2$ crossing and pivoted to each other at $a$. As shown the members of each frame are rigidly secured to each other, but I wish it to be understood that my invention is not limited to this feature. The seating surface and the back are provided by a fabric $d$ secured at its ends respectively to the upper cross-bars of the frames $b^1$, $b^2$ and $c^1$, $c^2$, as is known in the art. When the apparatus is used in the form of a seat the longer section $b^1$ of the frame $b^1$, $b^2$ supports the back portion of the fabric $d$ and the shorter section $b^2$ provides the front leg, and the shorter section $c^2$ of the frame $c^1$, $c^2$ supports the seat portion of the fabric $d$ and the longer section $c^1$ provides the rear leg. The frame $c^1$, $c^2$, is narrower than the frame $b^1$, $b^2$, and it is disposed between the side members thereof, and the shorter section $c^2$ is shorter than the shorter section $b^2$ of the frame $b^1$, $b^2$. Therefore the frame $c^1$, $c^2$ can be rocked about the pivot $a$, as is indicated by the arrows shown in Fig. 1, so that the frame section $c^2$ passes through the frame section $b^2$ and the frame section $c^1$ through the frame section $b^1$, whereupon the parts are in the position shown in Fig. 2 and the apparatus is in the form of a bed. In order that the length of the fabric be sufficient to provide in the bed the supporting surface, it is larger than is necessary in the seat and it is provided at its front end and at a part away from its front end with subsidiary means such as strap $s$, eyes, or seams $e$ and $f$ for attaching the same to the front cross-bar of the frame $c^1$, $c^2$.

Preferably a supporting member is provided for supporting the frame portion $b^1$ of the bed on the ground, which as shown consists of a pair of stays $g$ shiftably secured to the side members of the frame and connected with each other by transverse bars. For securing the stays to the side members slide shoes are provided each of which consists of two sections $h^1$ and $h^2$ pivoted to each other at $s$ and loosely fitting on the side members of the frame to permit easy displacement thereon. The stay $g$ is rigidly secured to one of said shoe sections and it permits the shoe to be readily shifted if it is perpendicular to the frame $b^1$. If, however, the stay sets on the ground as is shown in Fig. 2, or bears on the frame member $c^1$ as is shown in Fig. 1, it is slightly rocked forwards or backwards, and it is clamped on the frame member $b^1$. By thus constructing the joints of the stays $g$ a toothed rack or other means for fixing the shoes $h^1$, $h^2$ in position may be dispensed with.

In cases of a collapsible chair the supporting member $g$ projecting from the frame $b^1$, $b^2$ is objectionable. Therefore I prefer to provide folding stays. To show what may be done I have illustrated in Figs. 4 and 5 a construction in which the stay $g^1$ is connected to a short tubular arm $p$ made integral with the shoe section $h^2$. As shown the tubular arm $p$ is formed at one side with a longitudinal slot $i$ having at its lower end an enlarged portion $i^1$. The stay $g^1$ carries a knob $k$ having a flat neck portion $k^1$ and engaging in said slot $i$, $i^1$ in the manner shown in Fig. 5. If the said knob is in the position shown in Fig. 5 in which its flat neck portion engages the narrow part of the slot $i$, the stay can not be rocked. If, however, the stay is retracted from the arm $p$ until the knob engages the enlarged portion $i^1$ it can be rocked into position parallel to the frame $b^1$, $b^2$. While in Figs. 4 and 5 I have shown a construction in which the slot is formed on the arm $p$ and the knob $k$ is provided on the stay $g^1$, I wish it to be understood that my invention is not limited to this feature. It will also be understood that the invention is not limited to a construction in which a tubular arm $p$ is provided, or in which a single arm $p$ is located at one side of the stay $g^1$.

For more readily assembling or disconnecting the frames $b^1$, $b^2$, and $c^1$, $c^2$ I prefer to provide the joint shown in Figs. 6 and 7, which consists of a lateral pocket 1 provided on one of the frame members and formed with a slot $m$ having an enlarged portion $o$. The other frame member is provided with a knob $n$ which engages with its neck portion in the slot $m$. When making the joint the neck portion of the knob engages in the upper part of the enlarged portion $o$ of the slot and behind the shoulder provided thereby. By reason of this construction a reliable joint is produced which can easily be loosened and yet is not loosened by accident.

If desired the seat is equipped with arm rests $r$ which are pivoted thereto, and which in some cases are so connected to the frames as to be readily disconnected therefrom.

In some cases I prefer to provide means in the bed for securing the frame $c^1$, $c^2$ as against being rocked upwards by the weight of the person lying on the bed. To show what may be done a strap $q$ is attached respectively to the front transverse bars of the frames $b^1$, $b^2$ and $c^1$, $c^2$.

I claim:

1. A piece of furniture of the class described, comprising a pair of frames having side bars pivotally connected with each other and disposed one within the other, the lengths of the sections of the inner frame taken from the pivotal axis to the ends thereof being shorter than the corresponding sections of the outer frame, and the frames being constructed respectively at their inner and outer sides so as to permit the inner frame to be rocked through the outer frame, an apron attached at one end to one of said frames and adapted to be attached at its opposite end to either one of the ends of the other frame, and bracing means movable on said outer frame and supported by the inner frame or by the ground.

2. A piece of furniture of the class described, comprising a pair of frames having side bars pivotally connected with each other and disposed one within the other, the sections of the outer frame taken from the pivotal axis to the ends thereof being different in length and the lengths of the sections of the inner frame taken from the pivotal axis to the ends thereof being shorter than the corresponding sections of the outer frame, and the frames being constructed respectively at their inner and outer sides so as to permit the inner frame to be rocked through the outer frame, an apron attached with one end to one of said frames and adapted to be attached with its opposite end to either one of the ends of the other frame, and folding bracing means supporting the outer frame, shiftable on the longer section of said outer frame and in clamping engagement therewith, supported by one section of the inner frame or by the ground.

3. A piece of furniture of the class described, comprising a pair of frames having side bars and pivotally connected with each other and disposed one within the other, the sections of the outer frame taken from the pivotal axis to the ends thereof being different in length and the lengths of the sections of the inner frame taken from the pivotal axis to the ends thereof being shorter than the corresponding sections of the outer frame, and the frames being constructed respectively at their inner and outer sides so as to permit the inner frame to be rocked through the outer frame shiftable, an apron attached with one end to one of said frames and adapted to be attached with its opposite end to either one of the ends of the other frame, and bracing means supporting the outer frame on the longer section of said inner frame comprising an elongated member and a member shiftable on and in clamping engagement with said longer section and having pin and slot connection with said elongated member, said pin being prismatic in cross-section and said slot having a narrow portion providing a non-rocking guide for the pin and an enlarged portion permitting rocking movement thereof.

4. A piece of furniture of the class described comprising a pair of frames constructed of side bars and transverse bars and pivotally connected with each other and disposed one within the other, the joint of said frames comprising a member formed with a slot open at one end and laterally enlarged at the other end to provide a shoulder, and a pivot bolt adapted to be passed through the non-enlarged portion of said slot and engaging in the assembled piece of furniture in the enlarged part of the slot and behind said shoulder.

In testimony whereof I have affixed my signature in presence of two witnesses.

RICHARD WEDEMANN.

Witnesses:
  HERMANN FAHLBERG,
  WILLI FAHN.